United States Patent
Kunc et al.

(10) Patent No.: US 9,946,966 B2
(45) Date of Patent: Apr. 17, 2018

(54) METHOD AND CIRCUIT FOR TUNING AN ANTENNA CIRCUIT OF AN ACTIVELY TRANSMITTING TAG

(71) Applicant: STMicroelectronics International N.V., Amsterdam (NL)

(72) Inventors: Vinko Kunc, Ljubljana (SI);
Maksimilijan Stiglic, Maribor (SI);
Kosta Kovacic, Maribor (SI)

(73) Assignee: STMicroelectronics International N.V., Schiphol (NL)

( * ) Notice: Subject to any disclaimer, the term of this patent is extended or adjusted under 35 U.S.C. 154(b) by 156 days.

(21) Appl. No.: 14/426,146

(22) PCT Filed: Sep. 4, 2013

(86) PCT No.: PCT/EP2013/068274
§ 371 (c)(1),
(2) Date: Mar. 4, 2015

(87) PCT Pub. No.: WO2014/037393
PCT Pub. Date: Mar. 13, 2014

(65) Prior Publication Data
US 2015/0254544 A1  Sep. 10, 2015

(30) Foreign Application Priority Data

Sep. 5, 2012 (SI) .................................. 201200274

(51) Int. Cl.
G06K 19/06 (2006.01)
G06K 19/07 (2006.01)
H01Q 1/22 (2006.01)

(52) U.S. Cl.
CPC ....... *G06K 19/0726* (2013.01); *H01Q 1/2208* (2013.01)

(58) Field of Classification Search
CPC ......... G06K 19/0726; G06K 19/07773; G06K 7/10316; H01Q 1/2208; H01Q 1/2225;
(Continued)

(56) References Cited

U.S. PATENT DOCUMENTS 6,272,321 B1 *  8/2001  Bruhnke .............. G06K 7/0008
455/196.1
7,058,372 B1   6/2006  Pardoen et al.
(Continued)

FOREIGN PATENT DOCUMENTS

EP  2230721 A1  9/2010
FR  2965084 A1  3/2012
(Continued)

*Primary Examiner* — Laura Gudorf
(74) *Attorney, Agent, or Firm* — Slater Matsil, LLP

(57) ABSTRACT

Tuning an antenna circuit of an actively transmitting tag to a frequency of an interrogator carrier signal after the tag was inserted into a host device is accomplished by detecting presence of the interrogator carrier signal at a location of the actively transmitting tag and hereafter setting capacitances of capacitors and/or inductances of coils comprised in said antenna circuit in a way that resonance of said antenna circuit is established while the antenna circuit is excited by a magnetic field of said interrogator carrier signal. This allows automatic tuning of an antenna circuit of an actively transmitting tag after it was inserted together with a miniature card into a host device, such as a mobile telephone, personal digital assistant, tablet PC and similar devices.

20 Claims, 2 Drawing Sheets

(58) Field of Classification Search
CPC ... H01Q 9/0442; H04B 5/0062; H04B 5/0081
USPC .................. 235/492; 340/10.1, 572.1–572.9
See application file for complete search history.

(56) References Cited

U.S. PATENT DOCUMENTS

| | | |
|---|---|---|
| 8,798,535 B2 | 8/2014 | Charrat et al. |
| 2009/0174592 A1* | 7/2009 | Muellner ........... G06K 19/0723 |
| | | 342/51 |
| 2009/0243779 A1 | 10/2009 | Rofougaran |
| 2012/0071090 A1* | 3/2012 | Charrat ............ G06K 19/07771 |
| | | 455/41.1 |
| 2012/0311356 A1* | 12/2012 | Tan ......................... H02J 5/005 |
| | | 713/310 |

FOREIGN PATENT DOCUMENTS

| | | |
|---|---|---|
| WO | 2006/106481 A1 | 10/2006 |
| WO | 2009/156879 A1 | 12/2009 |
| WO | 2013/002736 A1 | 1/2013 |

\* cited by examiner

METHOD AND CIRCUIT FOR TUNING AN ANTENNA CIRCUIT OF AN ACTIVELY TRANSMITTING TAG

BACKGROUND OF THE INVENTION

The invention relates to a method for tuning an antenna circuit of an actively transmitting tag to a frequency of an interrogator carrier signal, strictly speaking for retuning after a guest miniature card provided with said actively transmitting tag has been inserted into a host device. The invention also relates to a circuit for carrying out such tuning. Tuning according to the invention is carried out automatically.

An actively transmitting tag (PCT/SI2012/000024) is usually provided with an antenna having very small dimensions, and this is why active transmitting of the tag is applied. Communication of the actively transmitting tag with an interrogator proceeds through a magnetic coupling of their coils, which are components of their antenna circuits with resonance frequencies of e.g. 13.56 MHz according to standard ISO 14443 or ISO 15693. Mutual tuning of tag's and interrogator's antenna circuits to each other increases the strength of signals at their antennas by their quality factors. A distance, at which they can still communicate with each other, gets increased.

Typically, an actively transmitting tag is typically applied in a miniature card, for example a micro SD card or a SIM card. The miniature card is intended to be inserted into a host mobile device such as a mobile telephone, personal digital assistant, tablet PC and similar devices. The actively transmitting tag obtains supply voltage from the host device.

Work environment of the actively transmitting tag is considerably altered when inserted together with the miniature card into a host device. Electrically conductive materials incorporated in a host device reduce inductances in a tag's antenna circuit, the embedded dielectric materials increase antenna circuit capacitances, and parasitic capacitances appear.

A resonance frequency of the tag's antenna circuit is changed by insertion of a miniature card into a host device. Production of miniature cards is normally standardized for all mobile host devices, yet the environment of a connector for a miniature card in host devices strongly varies from one device to another. A producer thus cannot design an actively transmitting tag in a way for its antenna circuit to keep the resonance at the frequency of 13.56 MHz in various mobile host devices.

There is known a miniature card having an elongated coil of a thickness of merely 0.5 mm and provided with a high-permeability core, e.g. ferrite core. Said coil is arranged in an antenna circuit in an immediate proximity of and along at least one electrically conductive plate, which does not cross a magnetic axis of the coil (FR 2 965 084, FR 2 965 083). A resonance frequency of the antenna circuit having such configuration is set to a frequency of 13.56 MHz and remains unchanged even after the antenna circuit has been inserted into various mobile host devices.

Indeed, this technical solution has solved the technical problem of how to produce such miniature card that an environment in the host device will not change the resonance frequency of said antenna circuit but it is very hard to produce such coil as well as to provide the miniature card with one or two electrically conductive plates. It is much easier to produce a coil with conductive strips on a printed circuit board of the miniature card, however, a magnetic axis of such coil is perpendicular to a plane of the printed circuit board.

SUMMARY OF THE INVENTION

The following description is related to the technical problem of how a method for automatically tuning an antenna circuit of an actively transmitting tag after having been inserted into a host device should be, and of how a circuit for carrying out said method should be.

The three embodiments of the technical solution as proposed allow an automatic tuning of an antenna circuit of an actively transmitting tag after it has been inserted together with a miniature card into a host device such as a mobile telephone, personal digital assistant, tablet PC and similar devices.

BRIEF DESCRIPTION OF THE DRAWINGS

The invention will now be explained in more detail by way of the description of three embodiments of the method and by way of three embodiments of the circuit intended for tuning an antenna circuit within an actively transmitting tag as well as by way of block diagrams representing in FIG. 1 a first embodiment of a circuit, which enables tuning a tag's antenna circuit and a tag's controlled oscillator in absence of an interrogator magnetic field, FIG. 2a a second embodiment of a circuit, which enables tuning a tag's antenna circuit and a tag's controlled oscillator in presence of an interrogator magnetic field, and FIG. 2b a third embodiment of a circuit, according to which a tag's antenna circuit can be tuned by using an interrogator magnetic field.

DETAILED DESCRIPTION

Figure 1:
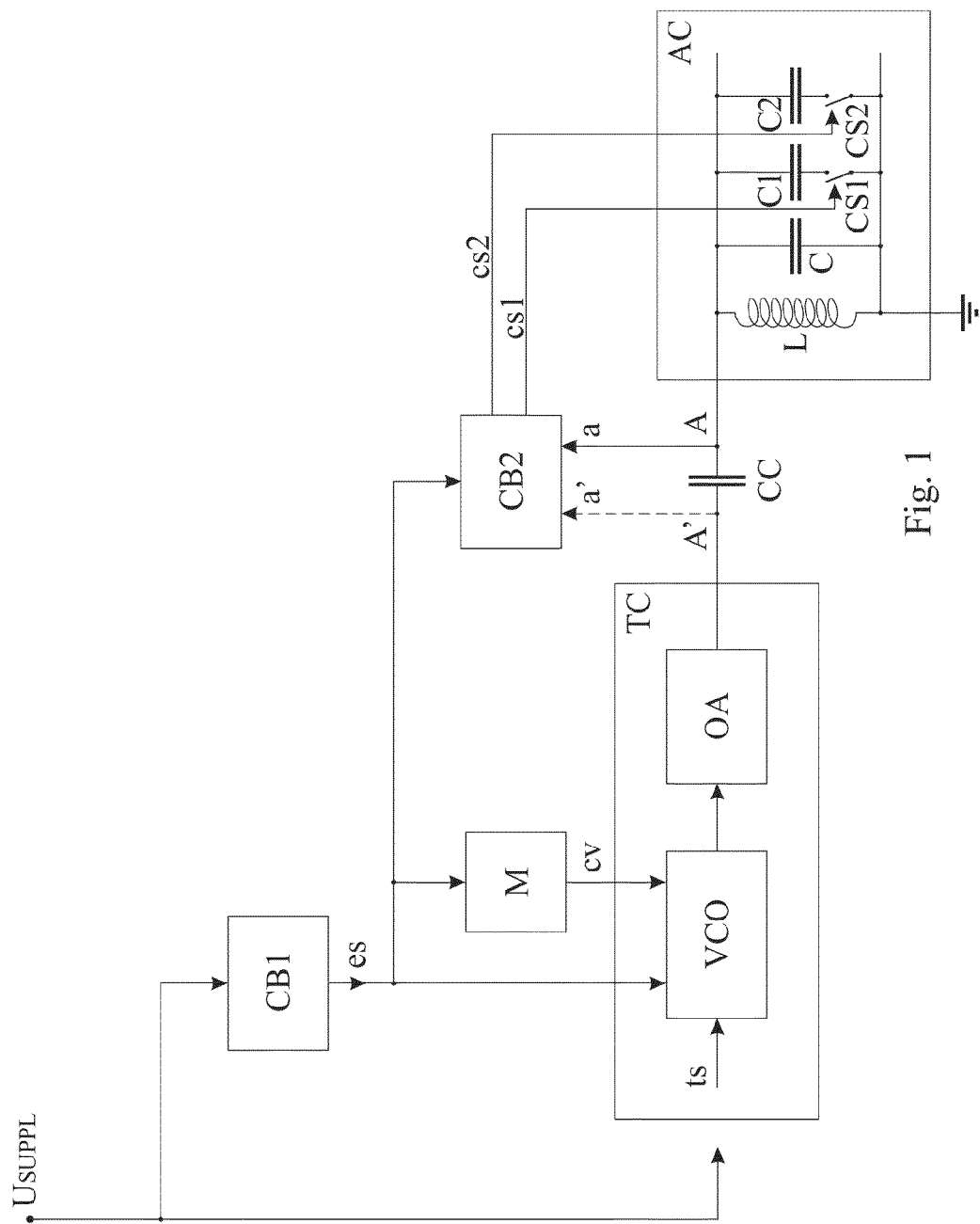

According to a first embodiment of a method for tuning an antenna circuit of an actively transmitting tag to a frequency of an interrogator carrier signal after the tag has been inserted into a host device, the tag's antenna circuit is excited by an output voltage of a controlled oscillator, e.g. a voltage controlled oscillator, which is controlled by such control voltage for the controlled oscillator to generate an output signal with the frequency of said interrogator carrier signal.

This value of the control voltage was already determined when the actively transmitting tag was produced and was stored in a tag's memory.

The tag's antenna circuit now embedded in the host device is retuned by setting capacitances of capacitors and/or inductances of coils comprised in said antenna circuit in a way that the resonance of said antenna circuit will be at said frequency of the interrogator carrier signal. At the same time, the tag's controlled oscillator is tuned.

The tag's antenna circuit is tuned whenever supply voltage was fed to the actively transmitting tag following a feeding interruption, or is merely tuned after the supply voltage in a host device was supplied to the actively transmitting tag for the first time or after a limited number of switch-ons.

Said limited number of switch-ons is application dependent. A reasonable value therefore should be the maximum number of estimated possible reinsertions of the tag into said host device.

Said two possible moments for retuning the tag's antenna circuit also apply to the second and third embodiments of the method for tuning an antenna circuit of the actively transmitting tag, yet provided that a magnetic field must exist at a location of the actively transmitting tag due to the interrogator carrier signal.

According to a second embodiment of the method for tuning an antenna circuit of an actively transmitting tag to a frequency of an interrogator carrier signal after the tag has been inserted into a host device, the presence of a supply voltage at a feeding terminal of the tag is first detected. At the same time, the interrogator carrier signal at a location of the actively transmitting tag is verified for presence.

A value of a control parameter, e.g. of a control voltage, for a tag's controlled oscillator is then determined according to a closed-loop method, at which value the controlled oscillator will generate an output signal with the frequency of the interrogator carrier signal. Hereby the tag's controlled oscillator is tuned to said frequency.

Hereafter the tag's antenna circuit is excited by the output signal of the voltage controlled oscillator, which is controlled by the control voltage having said value. Capacitances of capacitors and/or inductances of coils comprised in said antenna circuit are set in a way that the resonance of the antenna circuit is attained at the frequency of the interrogator carrier signal. Hereby the tag's antenna circuit is tuned to said frequency as well.

According to a third embodiment of the method for tuning an antenna circuit of an actively transmitting tag to a frequency of an interrogator carrier signal after the tag has been inserted into a host device, the presence of the interrogator carrier signal is first tried to be detected at a location of the actively transmitting tag.

Hereafter capacitances of capacitors and/or inductances of coils comprised in said tag's antenna circuit are set in a way that the resonance of said antenna circuit is established while being excited by a magnetic field of the interrogator carrier signal. The tag's antenna circuit is tuned to said frequency of an interrogator carrier signal.

A first embodiment of a circuit for tuning an antenna circuit AC of an actively transmitting tag to a frequency of an interrogator carrier signal after the tag has been inserted into a host device is shown in FIG. 1. Said embodiment is intended for the case that the antenna circuit AC should also be able to be tuned in absence of a magnetic field of the interrogator carrier signal.

A terminal A of the antenna circuit AC is connected to an output amplifier OA within a transmitting circuit TC. A transmit signal is conducted to said output amplifier OA when the actively transmitting tag is operating.

An enabling signal es intended to trigger tuning is generated in a first control block CB1 only after a supply voltage USUPPL has been fed to said block.

According to a variant of said first embodiment, the enabling signal es at the output of the first control block CB1 is generated only after the supply voltage USUPPL has been fed to the actively transmitting tag in the host device for the first time or again after a limited number (cf. above) of switch-ons.

The enabling signal es is conducted to a first control input of a tag's voltage-controlled oscillator VCO, which actually represents any controlled oscillator, and a control input of a memory M. Said first control input is foreseen to enable the controlled oscillator.

The memory M stores a value of the control voltage cv in the case of the voltage-controlled oscillator VCO, at which value said controlled oscillator VCO generates a signal with a frequency of the interrogator carrier signal. Said value of the control voltage cv was already determined at producing the tag and was stored in the tag's memory M.

An output of the memory M is connected to a second control input of said tag's voltage-controlled oscillator VCO. Said second control input is foreseen for the control voltage cv.

The enabling signal es is also conducted to a first control input of a second control block CB2 said input being foreseen to enable said block. The second control block CB2 automatically carries out the tuning of the antenna circuit AC while said antenna circuit is excited by an output signal of said tag's voltage-controlled oscillator VCO, which has now been tuned to a frequency of the interrogator carrier signal.

The terminal A of the antenna circuit AC is connected to a second control input of the second control block CB2, which thus obtains voltage at the terminal A at each setting of the tag's antenna circuit AC. When resonance is achieved said voltage is highest.

A first, a second and further outputs of the second control block CB2 are connected to a control terminal of a first, a second and a further controlled switch CS1, CS2, . . . foreseen for connecting a first, a second and a further capacitor C1, C2, . . . and/or a first, a second and a further coil to said tag's antenna circuit AC. The second control block CB2 automatically turns the controlled switches CS1, CS2, . . . on and off until voltage at the terminal A reaches the peak value.

In its current environment the tag's antenna circuit AC now has attained the resonance at the frequency of the interrogator carrier signal.

According to a variant of the first embodiment of the circuit, the terminal A and a terminal A' of a coupling capacitor CC, which is connected between the tag's antenna circuit AC and an output terminal of the tag transmitting circuit TC, are connected to the second and a third control input, respectively, of the second control block CB2. In this way, the second control block CB2 gets voltages a, a' at the terminals A and A', respectively, as well as a phase difference between them at each individual setting of the tag's antenna circuit AC. When resonance is attained, the phase difference between said voltages a, a' at the terminals A and A' equals $\pi/2$.

Figure 2A:
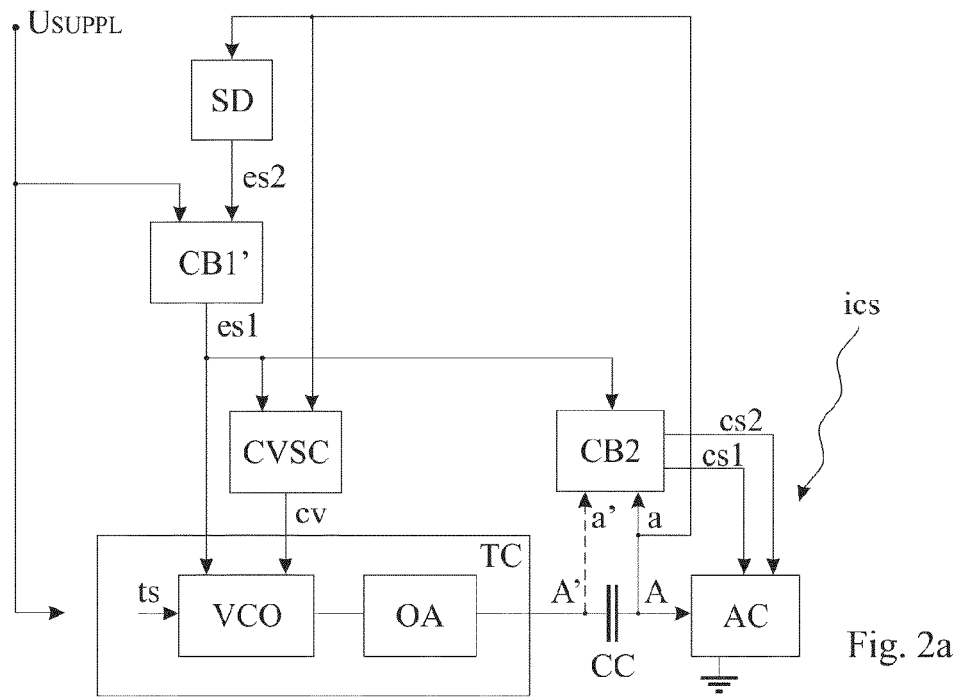

A second embodiment of the circuit for tuning an antenna circuit AC of an actively transmitting tag to a frequency of an interrogator carrier signal ics after the tag has been inserted into a host device is shown in FIG. 2a. Said embodiment is intended for the case that the antenna circuit AC should be tuned in presence of a magnetic field due to the interrogator carrier signal ics.

A first enabling signal es1 is generated in a first control block CB1', which is foreseen to trigger said tuning after a supply voltage USUPPL and a second enabling signal es2 have been conducted to said block.

The second enabling signal es2 is generated in a signal detector SD after the presence of the interrogator carrier signal ics at the location of the actively transmitting tag was detected.

According to variants of the second embodiment of the circuit, the first enabling signal es1 is generated in the first control block CB1' only after the supply voltage USUPPL has been fed to the actively transmitting tag in the host device for the first time or again after a limited number (cf. above) of switch-ons provided that at that time the actively transmitting tag is situated in said interrogator magnetic field.

The first enabling signal es1 is conducted to a first control input of a tag's voltage-controlled oscillator VCO and a first control input of a circuit CVSC foreseen to set a control voltage cv by means of a closed-loop method. The control voltage cv is foreseen to control said voltage controlled oscillator VCO. Said first control inputs are foreseen to enable respective circuits.

The first enabling signal es1 is also conducted to a first control input of a second control block CB2, which control input is foreseen to enable said block. The second control block CB2 automatically carries out the tuning of the antenna circuit AC by means of output control signals cs1, cs2, . . . .

A terminal A of the antenna circuit AC is connected to an input of the signal detector SD, which generates said second enabling signal es2. Said terminal A is also connected to a second control input of the circuit CVSC, which input is foreseen for a reference frequency being in this way the frequency of the interrogator carrier signal ics.

The control voltage cv as determined in said circuit CVSC is conducted to a second control input of said voltage-controlled oscillator VCO.

The connecting terminal A of the antenna circuit AC is connected to a second control input of the second control block CB2, to which in this way a voltage at the terminal A at a particular setting of the antenna circuit AC is conducted.

A first, a second and further outputs of the second control block CB2 are connected to a control terminal of a first, a second and a further, respectively, controlled switches CS1, CS2, . . . foreseen for connecting a first, a second and a further, respectively, capacitors C1, C2, . . . and/or a first, second and a further, respectively, coils to said antenna circuit AC. The second control block CB2 automatically turns said controlled switches CS1, CS2, . . . on and off until the voltage at the terminal A attains the maximum value.

The tag's antenna circuit AC excited in its current environment by said voltage-controlled oscillator VCO tuned to the frequency of the interrogator carrier signal ics now has the resonance at the frequency of the interrogator carrier signal ics.

An output signal of a tag's transmitting circuit TC during tuning preferably gets weaker than later during transmitting.

According to a variant of the second embodiment of the circuit, the terminal A and the terminal A' of a coupling capacitor CC, which is connected between the tag's antenna circuit AC and an output terminal of the tag's transmitting circuit TC, are connected to the second and a third control input, respectively, of the second control block CB2. In this way, the second control block CB2 gets voltages a, a' at the terminals A and A', respectively, and a phase difference between them at each individual setting of tag's antenna circuit AC. Based on these data, the second control block CB2 determines a setting, at which the tag's antenna circuit AC attains resonance at the frequency of the interrogator carrier signal ics.

Figure 2B:
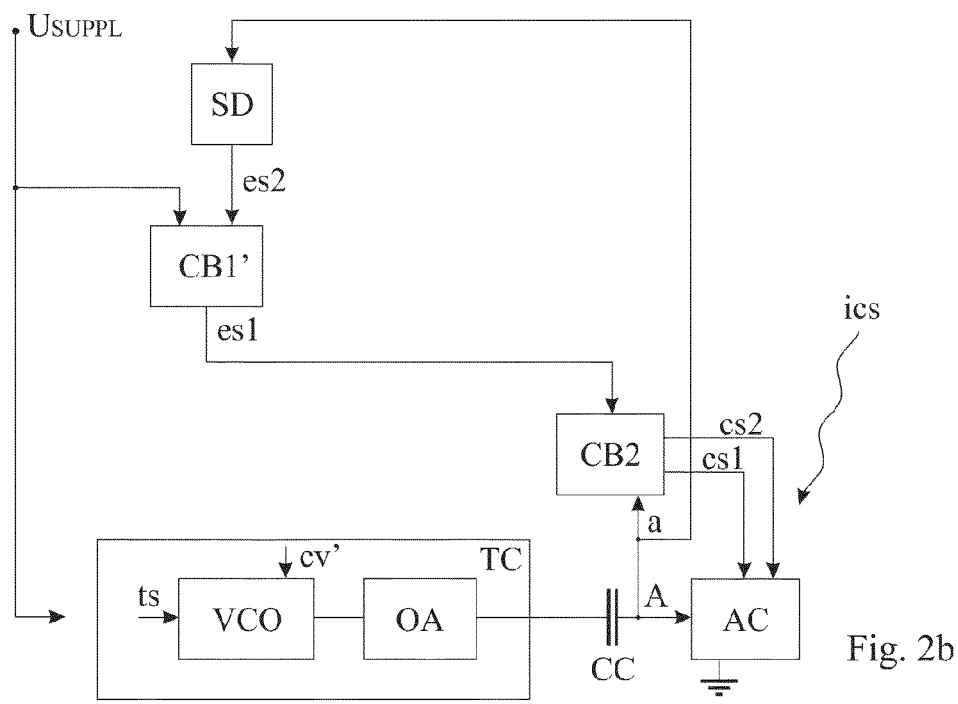

A third embodiment of the circuit for tuning an antenna circuit AC of an actively transmitting tag to a frequency of an interrogator carrier signal ics after the tag has been inserted into a host device is shown in FIG. 2b. Said embodiment is intended for the case that the antenna circuit AC should be tuned by only using the interrogator carrier signal ics.

A first enabling signal es1 is generated in a first control block CB1', which is foreseen to trigger tuning, after a supply voltage USUPPL as well as a second enabling signal es2 have been conducted to said block.

Said second enabling signal es2 is generated in a signal detector SD. A terminal A of the tag's antenna circuit AC is connected to an input of the signal detector SD. The second enabling signal es2 is generated after presence of the interrogator carrier signal ics was detected at a location of the actively transmitting tag.

According to variants of the third embodiment of the circuit, the first enabling signal es1 at an output of the first control block CB1' is generated only after the supply voltage USUPPL was fed to the actively transmitting tag in the host device for the first time or again after a limited number (cf. above) of switch-ons, provided that at those times the actively transmitting tag is situated in an interrogator magnetic field.

The first enabling signal es1 is conducted to a first control input of a second control block CB2, which input is foreseen to enable said block. The terminal A of the tag's antenna circuit AC is connected to a second control input of the second control block CB2. The second control block CB2 automatically carries out tuning of said antenna circuit AC.

A first, a second and further outputs of the second control block CB2 are connected to a control terminal of a first, a second and further, respectively, controlled switches CS1, CS2, . . . foreseen for connecting a first, a second and further, respectively, capacitors C1, C2, . . . and/or a first, a second and further, respectively, coils to said antenna circuit AC. The second control block CB2 automatically turns the controlled switches CS1, CS2, . . . on and off until a voltage at the terminal A attains the maximum value.

The tag's antenna circuit AC excited in its current environment by only the interrogator carrier signal ics now reached resonance at the frequency of said interrogator carrier signal ics.

A tag's voltage-controlled oscillator VCO, otherwise controlled by a stored control voltage cv', is non-operative during said tuning.

The invention claimed is:

1. A method for tuning an antenna circuit of an actively transmitting tag to a frequency of an interrogator carrier signal, the method comprising:
   inserting the tag into a host device that is configured to provide a supply voltage;
   after the tag is inserted into the host device, detecting a presence of the supply voltage at a feeding terminal of the tag;
   exciting the antenna circuit of the tag by an output signal of a controlled oscillator, which is controlled by a control voltage, the control voltage having a value at which the controlled oscillator generates a signal with the frequency of the interrogator carrier signal, wherein the value was determined when producing the tag and was stored in a memory; and
   while the antenna circuit is excited, retuning the antenna circuit by setting capacitances of capacitors and/or inductances of coils comprised in the antenna circuit in a way that resonance of the antenna circuit will be at the frequency of the interrogator carrier signal.

2. The method as recited in claim 1, wherein the antenna circuit is tuned whenever the supply voltage is again fed to the tag following a feeding interruption.

3. The method as recited in claim 1, wherein the antenna circuit is only tuned when the supply voltage is fed to the tag in the host device the first time.

4. The method as recited in claim 1, wherein the antenna circuit of the tag is tuned after a predetermined number of switch-ons.

5. The method of claim 1, wherein the retuning the antenna circuit is in the absence of a magnetic field of the interrogator carrier signal.

6. The method of claim 1, further comprising generating an enable signal at an input of the controlled oscillator, the enable signal corresponding to the presence of the supply voltage at the feeding terminal of the tag.

7. A method for tuning an antenna circuit of an actively transmitting tag to a frequency of an interrogator carrier signal, the method comprising:
   inserting the tag into a host device that is configured to provide a supply voltage;
   after the tag is inserted into the host device, detecting a presence of the supply voltage at a feeding terminal of the tag;
   exciting the antenna circuit with an output voltage of a voltage-controlled oscillator (VCO), which is controlled by a control voltage;
   detecting a presence of the interrogator carrier signal at a location of the tag;
   determining a value of the control voltage according to a closed-loop method based on the detected interrogator carrier signal;
   generating, by the VCO, a signal with the frequency of the interrogator carrier signal; and
   while the antenna circuit is excited, tuning the antenna circuit to have a resonance at the frequency of the interrogator signal by setting capacitances of capacitors and/or inductances of coils comprised in the antenna circuit in accordance with a first voltage having a first voltage phase at an output of the VCO and a second voltage having a second voltage phase at an input of the antenna circuit.

8. The method as recited in claim 7, wherein the antenna circuit is tuned whenever a supply voltage is again fed to the actively transmitting tag following a feeding interruption.

9. The method as recited in claim 7, wherein the antenna circuit is only tuned when a supply voltage is fed to the actively transmitting tag in the host device the first time.

10. The method as recited in claim 7, wherein the antenna circuit of the tag is tuned after a predetermined number of switch-ons.

11. The method of claim 7, further comprising generating an enable signal at an input of the voltage-controlled oscillator, the enable signal corresponds to the presence of the supply voltage and the interrogator carrier signal.

12. The method of claim 7, further comprising:
   generating a first voltage at an output of the voltage-controlled oscillator; and
   generating a second voltage at an input of the antenna circuit.

13. The method of claim 12, further comprising determining a phase difference between the first voltage and the second voltage, the resonance of the antenna circuit is at the frequency of the interrogator carrier signal when the phase difference is equal to pi/2.

14. A method for tuning an antenna circuit of an actively transmitting tag to a frequency of an interrogator carrier signal, the method comprising:
   inserting the tag into a host device that is configured to provide a supply voltage;
   after the tag is inserted into the host device, detecting a presence of the supply voltage at a feeding terminal of the tag;
   exciting the antenna circuit by a magnetic field of the interrogator carrier signal; and
   after presence of the interrogator carrier signal has been detected at a location of the tag and while the antenna circuit is excited, tuning the antenna circuit to have a resonance at the frequency of the interrogator carrier signal by setting capacitances of capacitors and/or inductances of coils comprised in the antenna circuit.

15. The method as recited in claim 14, wherein the antenna circuit is tuned whenever a supply voltage is again fed to the actively transmitting tag following a feeding interruption.

16. The method as recited in claim 14, wherein the antenna circuit is only tuned when a supply voltage is fed to the actively transmitting tag in the host device the first time or again after a limited number of switch-ons.

17. The method of claim 14, further comprising generating a first enable signal that enables tuning of the antenna circuit.

18. The method of claim 17, further comprising generating a second enable signal corresponding to the presence of the interrogator carrier signal, the first enable signal is generated in accordance with the presence of the second enable signal and the presence of the supply voltage at the feeding terminal of the tag.

19. The method of claim 14, wherein a controlled oscillator of the actively transmitting tag is non-operative during tuning of the antenna circuit.

20. The method of claim 14, wherein the antenna circuit is tuned after a predetermined number of switch-ons in the presence of the magnetic field of the interrogator carrier signal.

* * * * *